361-261. OR RE9,611 SR

SEARCH ROOM

S. GARDINER, Jr., dec'd.,
Assignor, by mesne assignments, to E. N. DICKERSON, JR.

SEARCH ROOM

Apparatus for Lighting Gas by Electricity.

RE No. 9,611. Reissued March 22, 1881.

97

Witnesses:
Geo. H. Miatt
F. O. McCleary

E. N. Dickerson Jr.
Assignee of
Saml Gardiner Jr. Inventor:
deceased
By his Attorney
Charles E. Foster

N. PETERS, PHOTO-LITHOGRAPHER, WASHINGTON, D. C.

UNITED STATES PATENT OFFICE.

EDWARD N. DICKERSON, JR., OF NEW YORK, N. Y., ASSIGNEE, BY MESNE ASSIGNMENTS, OF SAMUEL GARDNER, JR., DECEASED.

APPARATUS FOR LIGHTING GAS BY ELECTRICITY.

SPECIFICATION forming part of Reissued Letters Patent No. 9,611, dated March 22, 1881.

Original No. 62,125, dated February 19, 1867. Application for reissue filed January 29, 1881.

*To all whom it may concern:*

Be it known that SAMUEL GARDINER, Jr., late of the city of Washington, in the District of Columbia, invented a new and Improved Apparatus for Lighting Gas by Electricity; and I do hereby declare that the following is a full, clear, and exact description of the nature, construction, and operation of the same, sufficient to enable others skilled in the art to which it appertains to fully understand and use the same, reference being had to the accompanying drawings, which are made part of this specification, and in which—

Figure 1:
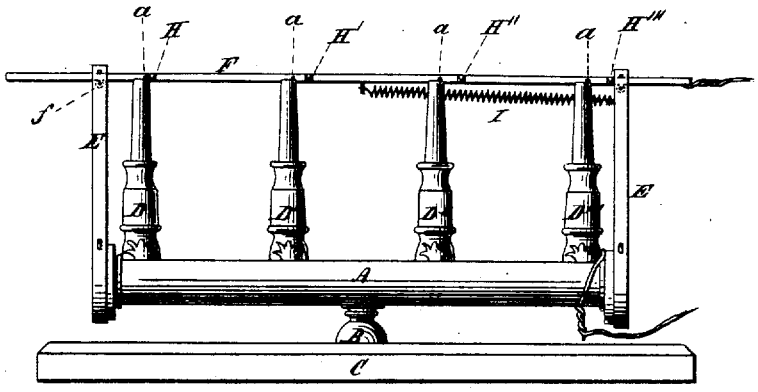
Figure 2:
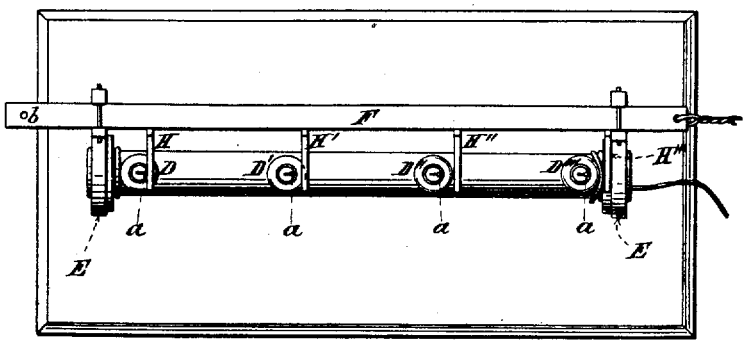
Figure 3:
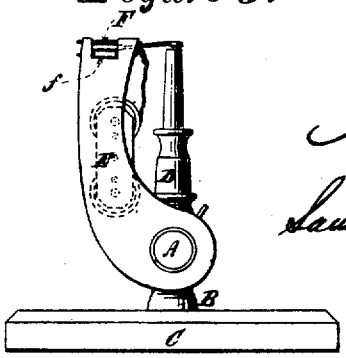

Figure 1 is a side elevation. Fig. 2 is a top view or plan. Fig. 3 is an elevation, showing one burner.

Similar letters of reference indicate corresponding parts in the several figures.

This invention relates to a method of lighting gas by electricity by occasioning a spark at the point near the orifice at which the gas escapes, and is shown as applied to a manual or hand lighter—that is to say, one adapted to be operated by the hand of the operator.

The method of lighting gas here shown is applicable to lighting a series of burners consecutively by one movement; but the number of burners to which it may be applied may be varied.

The apparatus shown consists generally of a movable device mounted in fixed bearings, carrying spring contact-points and operated to bring such points in contact with the burners to be lighted, so as to produce a spark at the orifice of the escaping gas. This igniting-spring is moved in one direction past a fixed electrode by hand, and is returned in the opposite direction by a spring. The object of this spring-contact is to insure a certain and sufficient contact between the moving and stationary poles of the battery.

One of the difficulties with apparatuses producing sparks at the burner is, that the points become covered with carbon or other extraneous matter, and a perfect contact is not secured. By having a spring or wiping contact this difficulty is avoided, and a better spark is produced than though a single indefinitely short stroke was made by a positively-moving electrode. By placing a number of these spring-contacts in connection with the same moving bar or mechanism, I can light a number of burners simultaneously, and by arranging the springs to come in contact with their respective fixed electrodes at different points in the movement of the mechanism the burners are lighted successively and by a smaller battery than though they were all lighted instantaneously. The exact form of apparatus for moving the spring-point past the fixed electrode is not material, and in one form of my apparatus is employed a branch moving electrode supported at the lower part of the burner and reaching up to the burner-tip. Of course the fixed and moving electrodes must be insulated from each other, so that the battery may only be closed at the instant of closure at the point of the burner.

The vibrating electrode may be moved by the hand, or by a cord or other mechanical device, or by an electrical device. Stops should be employed to limit the motion of the vibrating electrode.

In the drawings, A is the gas-pipe, shown supported by a foot, B, upon the base C. Attached to the pipe are the burners D D′ D″ D‴, but four of which are shown, though the number may be much increased.

E E are insulating rubber brackets attached to the pipe or any neighboring object, so as to form a support for the bar F, which traverses back and forth on rollers *f* in slots in the upper portion of the brackets E. Projecting from the bar F are the keys H H′ H″ H‴, whose thin portion forms a spring, while underneath at the end is a prism of metal secured by one face to the spring-piece, and having an edge projecting downward. On the tip of each burner is a platinum point, *a*, which projects upward, so as to engage with its key H as the bar F is moved back and forth by power applied to the end *b*, and returned by the force of the spring I, which is attached to the bar F and to the bracket E at its respective ends. The platinum points on the tips of the burners are placed in proximity to the gas-orifices therein, so as to light the flowing gas when a spark passes from the key to the platinum point.

Although the apparatus is susceptible of being arranged for a large number of burners, it is described in reference to four, which will afford a clear understanding of its operation. The burners being placed, say, two inches apart, and it being required to light them consecutively by a single motion of the bar, if the latter have a longitudinal motion of half an inch, there will be two and one-eighth inches between the keys H H′, two and a quarter inches between keys H′ H″, two and three-eighth inches between keys H″ H‴, so that when the key H is in contact with the platinum tip of burner D the key H′ would be one-eighth of an inch from burner D′, and the key H″ an extra one-eighth or one-quarter inch in the rear of its burner D″, and so on. Thus it will be readily perceived that the keys come in contact with their respective burners in succession and not simultaneously, and the full force of the battery is applied to each burner in succession.

One-eighth of an inch is stated as the successive increment of distance, but a sixteenth or a thirty-second may be sufficient; and thus a very lengthened series of burners may be lighted in a fraction of a second consecutively.

The bar F may be supported upon insulators on the level of the gas-pipe and the keys be in the form of branches which reach up to the burner-tips. The bar will take such shape as may be desired to follow the line of burners, and may be circular to light a ring of burners; or a series of bars may be moved by a metallic connection.

One pole of the battery is connected to the gas-pipe and the other to the insulated bar F.

It will be well to make the prism under the springs of platinum, or to cover them with that metal.

The device may be used for exploding charges in quick succession.

What is claimed is—

1. A bar provided with a series of keys so spaced in reference to the burners as to be consecutively brought into electric connection therewith by a single impulse, substantially as described.

2. A movable bar with an insulated support, provided with spring-contact igniting-points adapted to be brought into contact with the burner by the movement of the bar, for the purpose set forth.

3. The combination of a gas-burner provided with a fixed electrode and an electrode movable upon a bearing provided with a spring contact-point and adapted to be brought in contact with the fixed electrode, substantially as described.

4. The combination of a gas-burner provided with a fixed electrode and a movable electrode adapted to be brought in contact with the fixed electrode and moved by means of a cord, substantially as described.

5. The combination of a gas-burner provided with a fixed electrode and a movable spring-electrode adapted to be brought in contact with the fixed electrode and moved by means of a cord, substantially as described.

6. The combination of a burner provided with a fixed electrode and a movable electrode carrying a spring contact-point and adapted to be brought in contact with the fixed electrode, and operated in one direction by the hand of the operator and in the opposite direction by a returning-spring, substantially as described.

In testimony whereof I have signed my name to this specification in the presence of two subscribing witnesses.

E. N. DICKERSON, JR.

Witnesses:
S. F. SULLIVAN,
WM. S. BEAMAN.